US010856155B2

(12) United States Patent
Scahill et al.

(10) Patent No.: US 10,856,155 B2
(45) Date of Patent: Dec. 1, 2020

(54) WLAN EXTENDER PLACEMENT

(71) Applicant: British Telecommunications Public Limited Company, London (GB)

(72) Inventors: Francis Scahill, London (GB); Simon Ringland, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/338,553

(22) PCT Filed: Sep. 21, 2017

(86) PCT No.: PCT/EP2017/073961
§ 371 (c)(1),
(2) Date: Apr. 1, 2019

(87) PCT Pub. No.: WO2018/060058
PCT Pub. Date: Apr. 5, 2018

(65) Prior Publication Data
US 2019/0387415 A1    Dec. 19, 2019

(30) Foreign Application Priority Data
Sep. 30, 2016    (EP) .................................... 1616730

(51) Int. Cl.
*H04W 4/00* (2018.01)
*H04W 16/20* (2009.01)
(Continued)

(52) U.S. Cl.
CPC .......... *H04W 16/20* (2013.01); *H04B 17/318* (2015.01); *H04W 16/26* (2013.01);
(Continued)

(58) Field of Classification Search
CPC ..... H04W 16/20; H04W 16/26; H04W 24/02; H04W 24/10; H04W 84/12; H04B 17/318
(Continued)

(56) References Cited

U.S. PATENT DOCUMENTS 8,634,393 B2 * 1/2014 Kraglund .............. H04W 48/16
370/338
8,929,931 B1   1/2015 Goldberg et al.
(Continued)

FOREIGN PATENT DOCUMENTS

CN    105101337 A    11/2015
EP      2645783 A1    10/2013
(Continued)

OTHER PUBLICATIONS

International Search Report and Written Opinion for corresponding International Application No. PCT/EP2017/073961 dated Dec. 21, 2017; 9 pages.
(Continued)

Primary Examiner — Marceau Milord
(74) Attorney, Agent, or Firm — Patterson Thuente Pedersen, P.A.

(57) ABSTRACT

In wireless local area networks (WLANs) having a wireless access point and a plurality of client devices, the range of the WLAN is affected by obstructions and sources of interference. This may result in coverage gaps in the WLAN. A method is described for operating a mobile wireless device to simulate the behavior of a WLAN extender to improve the coverage of the WLAN. The performance of a data link between the simulated extender device and the wireless access point, and performance of a data link between the simulated extender device and the plurality of client devices, is measured at various locations within the user premises. The results are processed to determine the benefit provided (Continued)

at the various locations by an extender device and a recommended location is provided to a user.

5 Claims, 5 Drawing Sheets

(51) Int. Cl.
| | | |
|---|---|---|
| *H04B 17/318* | (2015.01) | |
| *H04W 16/26* | (2009.01) | |
| *H04W 24/02* | (2009.01) | |
| *H04W 24/10* | (2009.01) | |
| *H04W 84/12* | (2009.01) | |

(52) U.S. Cl.
CPC .......... *H04W 24/02* (2013.01); *H04W 24/10* (2013.01); *H04W 84/12* (2013.01)

(58) Field of Classification Search
USPC ...................................... 455/434, 63.1, 63.4
See application file for complete search history.

(56) References Cited

U.S. PATENT DOCUMENTS

| | | | | |
|---|---|---|---|---|
| 9,131,391 | B2* | 9/2015 | Madan | H04W 24/10 |
| 9,322,089 | B2* | 4/2016 | Biondo | C22C 19/056 |
| 9,585,031 | B2* | 2/2017 | Kadel | H04W 24/02 |
| 9,699,786 | B2* | 7/2017 | Ngo | H04W 72/0453 |
| 9,807,629 | B1* | 10/2017 | Varlakov | H04W 24/04 |
| 9,819,901 | B1* | 11/2017 | Zhu | H04W 52/46 |
| 9,832,791 | B2* | 11/2017 | Ngo | H04W 16/14 |
| 9,930,670 | B2* | 3/2018 | Yi | H04K 3/00 |
| 10,041,455 | B2* | 8/2018 | Tsujii | F02M 35/10393 |
| 10,111,159 | B2 | 10/2018 | Scahill et al. | |
| 10,225,792 | B2* | 3/2019 | Lee | H04W 48/16 |
| 10,341,193 | B2* | 7/2019 | Rengarajan | H04W 24/02 |
| 10,368,247 | B2* | 7/2019 | Ngo | H04K 3/00 |
| 10,420,155 | B2* | 9/2019 | Hu | H04W 76/11 |
| 1,046,272 | A1 | 10/2019 | Johnson et al. | |
| 10,448,424 | B2* | 10/2019 | Ngo | H04W 16/14 |
| 2005/0286466 | A1* | 12/2005 | Tagg | H04L 12/2856 370/329 |
| 2010/0041364 | A1* | 2/2010 | Lott | G06Q 30/016 455/404.1 |
| 2011/0243020 | A1 | 10/2011 | Ponnuswamy | |
| 2013/0033995 | A1* | 2/2013 | Kraglund | H04W 48/16 370/252 |
| 2013/0051314 | A1* | 2/2013 | Ong | H04W 88/06 370/328 |
| 2014/0036696 | A1 | 2/2014 | Lee et al. | |
| 2014/0044005 | A1 | 2/2014 | Keys et al. | |
| 2014/0094142 | A1 | 4/2014 | Torres et al. | |
| 2014/0328257 | A1 | 11/2014 | Kamlani | |
| 2015/0103685 | A1 | 4/2015 | Butchko et al. | |
| 2015/0312771 | A1* | 10/2015 | Li | H04W 24/02 455/446 |
| 2015/0327082 | A1* | 11/2015 | Kadel | H04W 24/02 455/449 |
| 2015/0365158 | A1 | 12/2015 | Kindler | |
| 2015/0365833 | A1 | 12/2015 | Stafford et al. | |
| 2016/0036922 | A1 | 2/2016 | Centemeri et al. | |
| 2016/0105814 | A1 | 4/2016 | Hurst et al. | |
| 2016/0212031 | A1 | 7/2016 | Jain et al. | |
| 2016/0371394 | A1* | 12/2016 | Shahidi | H04B 17/318 |
| 2017/0134255 | A1* | 5/2017 | Amini | H04L 12/44 |
| 2017/0347298 | A1 | 11/2017 | Brown et al. | |
| 2017/0359759 | A1 | 12/2017 | Brown et al. | |
| 2019/0149443 | A1* | 5/2019 | Gunasekara | H04L 43/0811 |

FOREIGN PATENT DOCUMENTS

| | | |
|---|---|---|
| EP | 2 741 535 A1 | 6/2014 |
| GB | 2485388 A | 5/2012 |
| GB | 2554462 A | 4/2018 |
| WO | WO 2013/152305 A1 | 10/2013 |
| WO | WO-2018060089 | 4/2018 |

OTHER PUBLICATIONS

3GPP TS 24.234 V12.2.0 (Mar. 2015) "3rd Generation Partnership Project: Technical Specification Group Core; Network and Terminals: 3GPP System to Wireless Local Area Network (WLAN) interworking; WLAN User Equipment (WLAN UE) to network protocols; Stage 3 (Release 12)," 3GPP Standard; 3GPP TS 24.234, 3rd Generation Partnership Project (3GPP), Mobile Competence Centre; 650, Route Des Lucioles; F-06921 Sophia-Antipolis Cedex; France, vol. CT WG1, No. V12.2.0, Mar. 20, 2015 (Mar. 20, 2015), pp. 1-40, XP050927885, section 6, pp. 20-26 and section 8, pp. 28-36.
International Preliminary Report on Patentability for Application No. PCT/EP2017/073961, dated Apr. 11, 2019, 8 pages.
International Preliminary Report on Patentability for Application No. PCT/EP2017/074056, dated Apr. 11, 2019, 8 pages.
International Search Report and Written Opinion for Application No. PCT/EP2017/057206, dated Apr. 24, 2017, 14 pages.
International Search Report and Written Opinion for Application No. PCT/EP2017/074056, dated Nov. 22, 2017, 9 pages.
Application and Filing Receipt for U.S. Appl. No. 16/086,328, filed Sep. 19, 2018, Inventor(s): Johnson.
U.S. Appl. No. 16/335,417, filed Mar. 21, 2019, Inventor(s): Ringland.

* cited by examiner

WLAN EXTENDER PLACEMENT

CROSS-REFERENCE TO RELATED APPLICATION

The present application is a National Phase entry of PCT Application No. PCT/EP2017/073961, filed Sep. 21, 2017, which claims priority from EP Patent Application No. 1616730.6 filed Sep. 30, 2016 each of which is hereby fully incorporated herein by reference.

TECHNICAL FIELD

The present disclosure relates to wireless local area networks (WLAN) and in particular to a method for improving the placement of a WLAN range extender device within the WLAN to support connectivity to a wireless access point.

BACKGROUND

In wireless networking, a wireless access point (AP) is a device used to generate a wireless local area network (WLAN) to allow a number of wireless client devices to communicate using radio transmissions within a small geographical area such as a home or office. It is common for the APs generating the WLAN to operate in accordance with the IEEE 802.11 family of wireless protocols, more commonly known as Wi-Fi™.

WLANs generally can have a range of tens of meters which is large enough to cover a home or small office. However, despite the possible range, the exact coverage and data rates obtainable in any given location are dependent on the transmission power, frequency band of the WLAN and signal attenuation caused by the presence of obstructions and interference.

The transmission power is limited by licensing restrictions set by a radio regulator and also power constraints of the wireless devices themselves. The frequency is relevant because IEEE 802.11 operates in the 2.4 GHz and 5 Ghz range of unlicensed radio spectrum. The 2.4 GHz frequency range used in IEEE 802.11b/g/n provides longer range than the 5 Ghz frequency so suffers less from attenuation caused by obstructions, but the WLANS operating in 2.4 GHz are more susceptible to interference from other 2.4 Ghz WLANS as well as other devices operating in the non-licensed spectrum range such as Bluetooth™ devices, cordless land line telephones and microwave ovens. In contrast, the 5 Ghz band used in IEEE 802.11n/ac has a higher peak bandwidth and operates in a less congested range of spectrum with more available channels, but due to the shorter wavelengths, has a shorter range for a given transmission power and is more sensitive to attenuation caused by the presence of walls. In some applications, 5 Ghz WiFi is recommended for short range (distance between the WAP and the device), high bandwidth uses such as video data streaming, while 2.4 GHz WiFi is used where coverage and range is more important.

While the characteristics of WiFi in terms of transmission power and over the air propagation losses are well known and can be modeled to provide an estimate of the WLAN performance at any given distance from the access point in ideal conditions, the unknown factor at the deployment stage is the effect of obstructions and interference.

Considering the effect of obstructions, the specific characteristics of the user premises such as a home or office in terms of the construction of the walls, arrangement of furniture and location of the client devices relative to the access point can result in some parts of the user premises having a much lower signal quality than expected. Since the maximum attainable data rate over the WLAN varies with signal quality, at those parts of the user premises, if the data rates are too low the user's quality of experience will be affected. This may be in the form of slow network performance (e.g. long download speeds, stutter videos and/or dropped connections. In many cases, the user will think that the broadband connection is slow and not consider the internal network to be the bottleneck. Such areas of the user premises which cannot allow wireless communications over the WLAN will be referred to as "notspots".

To try to mitigate such gaps or notspots in the area covered by the WLAN, it is known to use extender devices. These extender devices are wireless devices connected to the WLAN and act as signal repeaters for the WLAN from their location in the user premises. Any received data packets from either the wireless access point or the user devices are retransmitted at the default transmission power. With appropriate positioning within the user premises, the range of the wireless access point WAN can be effectively extended to fill in the gaps in the WAP's coverage.

However, there is a network cost due to the extender device's re-transmission of received data packets. Wi-Fi is a polite protocol in that WLAN devices all use Carrier Sense Multiple Access with Collision Avoidance (CSMA-CA) to check the line is clear before transmitting. If there is a device which is already transmitting on the WLAN, all other devices will not attempt to transmit at that time and will try again at a later time. Since the retransmission of a received signal consumes radio air time resources, other devices are be prevented from transmitting their packets and so the overall bandwidth of the WLAN is reduced by up to 50%.

The placement of the extender is important because if the extender is located too far from the AP, then the connection speed is limited by the Signal to Noise Ratio (SNR) of the wireless link between the AP and the extender. The conventional advice is to place the WiFi Extender at a location which is halfway between the access point and the notspot. However, whilst this is a useful guideline, the midpoint will not always result in an optimal performance of the WiFi Extender.

Some extenders include visual indicators such as LEOs to indicate to a user when the extender is too far or too close to the AP. The determination being made on the basis of the quality (signal strength) of the wireless link to the AP. The extender being close to the AP will result in a good data link between the extender and the AP, however if the extender is too close to the AP, then it will not be improving the range of the WLAN. Therefore a predetermined threshold strength is stored in the extender and when the signal strength to the AP is above the threshold, the location of the extender is indicated as being too close to encourage the user to move the extender further away.

Whilst these methods of positioning the extender help to some degree, they do not take into account the particular WLAN environment variables and the locations of the devices themselves. In particular, physical distance does not always correspond directly to radio propagation losses. Furthermore, radio link losses are not symmetric. As mentioned earlier, mains powered devices such as APs and extenders typically use much higher transmit powers than client devices and in particular mobile client devices such as smartphones.

SUMMARY

Described embodiments aim to address the above problems.

In one aspect, an embodiment provides a method of assessing potential locations for an wireless network extender in a wireless network provided by a wireless access point, the method being performed by a scan device having a wireless local area network data interface and comprising: retrieving a plurality of data sets of performance data at various locations within a physical premises, a first set of wireless network signal strength metrics between the extender and AP and a second set of wireless network signal strength metrics between the scan device and at least one client device; accessing historical RSSI data of the normal signal strength between the wireless access point and the at least one client; determining whether the performance data indicate improvements at each of the locations; and identifying a recommended location for the extender device.

BRIEF DESCRIPTION OF THE FIGURES

Embodiments of the present disclosure will now be described with the aid of the accompanying Figures in which.

DETAILED DESCRIPTION OF THE DRAWINGS

Overview

Figure 1:
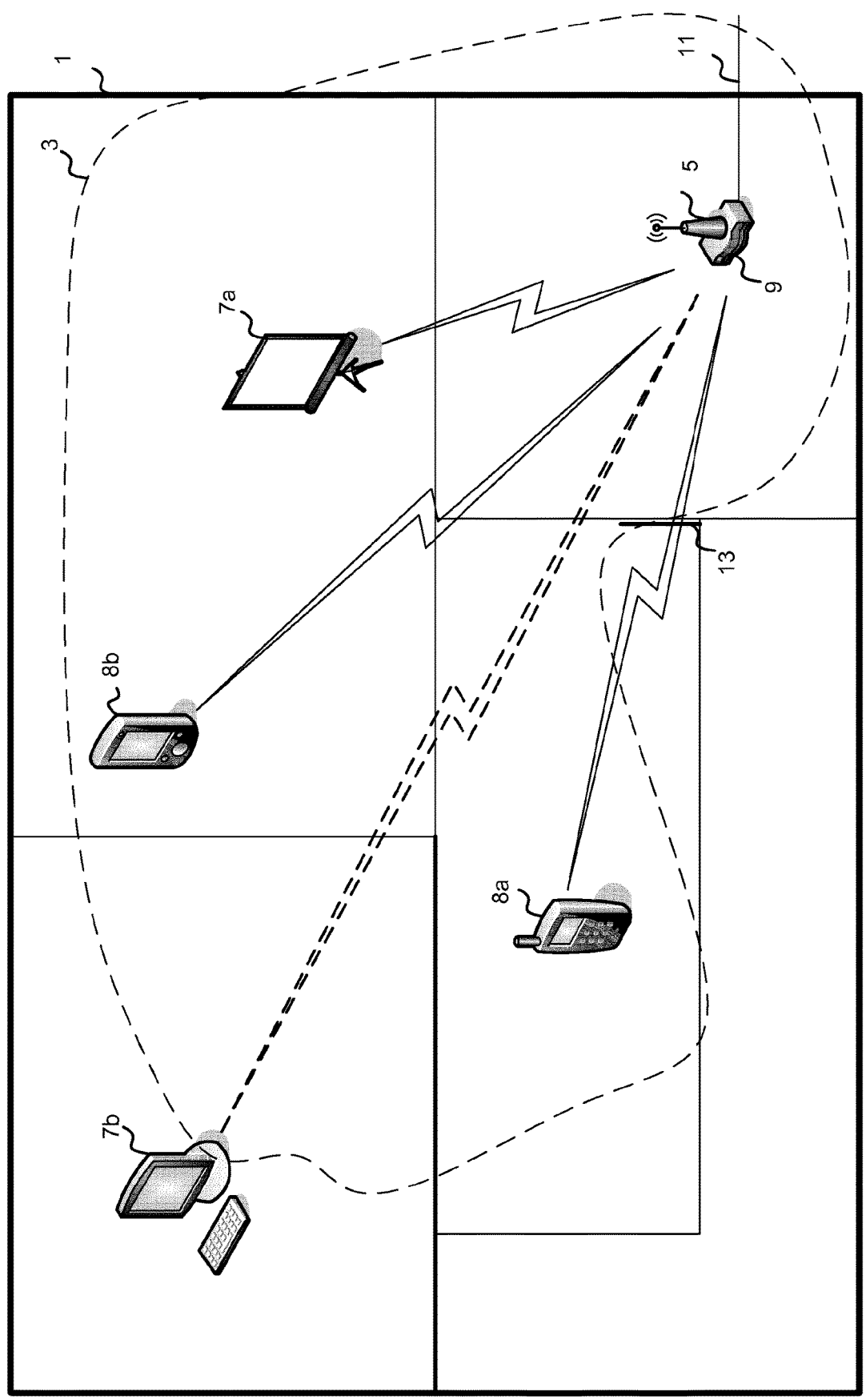
FIG. 1 shows an overview of a home broadband setup in accordance with a first embodiment.

FIG. 1 shows an overview of a user premises Wireless Local Area Network (WLAN) system in accordance with a first embodiment.

Within a user premises 1 such as a user's home or an office environment, a WLAN 3 is provided by a Wireless Access Point (AP) device 5.

The Wireless Access Point (WAP) 5 is responsible for providing wireless networking connectivity to a number of wireless client devices 7, 8 having wireless interfaces located within the user premises 1. Some of the wireless client devices 7 will typically have a fixed location within the user premises due to their size, for example desktop computers 7*b* and smart appliances such as televisions 7*a*. Increasingly there are also mobile client devices 8 which are portable enough to be moved around the user premises and so they have no fixed location. Examples include smartphones 8*b*, tablets 8*a*, small laptops, etc.

The AP 3 generates the wireless local area network (WLAN) 3 which is a wireless private network, shown in FIG. 1 having a range which in principle should extend throughout the user premises 1 so that all client devices can communicate with the WAP and each other.

In this embodiment, the WAP 5 generates a WLAN 3 in accordance with at least one of the IEEE 802.11 family of wireless protocols more commonly referred to as Wi-Fi™. For ease of explanation, the WAP creates a WLAN using IEEE 802.11n which provides for WLANs operating in the 2.4 GHz spectrum. In 2.4 Ghz WiFi there at least 11 defined operating channels and in this example the WLAN operates at channel 1 which has a centre frequency of 2412 MHz. The private WLAN has a network name, in this case "HomeWLAN" defined as a Service Set Identifier (SSID) and will also have an authentication password so that only authorized devices are able to successfully connect to the WLAN.

The client devices 7, 8 supporting the same wireless protocol as the WAP 5 and having the credentials for the WLAN can connect to the WLAN 3 at a connection speed which varies according to distance from the hub 3 and the presence of interference or attenuation. For example, client devices 7, 8 which have an unobstructed signal path to the WAP 5 are likely to connect at high data rates, up to several hundred Mbps in the 2.4 GHz variant of IEEE 802.11n. For devices 7, 8 which do not have a direct line of sight connection the WAP 5, the data rates will be much lower depending on the number of walls and the composition of the walls. If the attenuation caused by walls and other objects in the signal path between the WAP 5 and a client device is severe enough, then communication may only be possible intermittently. In FIG. 1, the desktop computer 7*b* has a weak link to the WAP 5.

While an AP 5 can be used to provide a WLAN for internal networking of client devices, in this embodiment, the WAP 5 is provided as part of a combined device also providing the functions of a modem, a router. This gateway device will be referred to as a hub 9. The modem section connects to an Internet Service Provider (not shown) via a data link 11. The ISP manages a connection to a Wide Area Network (WAN) such as the Internet (not shown). Various technologies can be used to provide the data link to the ISP and in this embodiment, the modem part of the hub 9 is a Digital Subscriber Line (DSL) modem.

The routing section of the hub 9 routes data between the various interfaces of the hub 9, for example between the WAP 5 and modem section of the hub 9 so that wireless devices can communicate with external resources on the Internet.

In this embodiment, the hub 9 is also configured to be part of a public hotspot network such as the BT WiFi™ hotspot network. The WAP 5 is configured to generate a second WLAN using the same channel (channel1) having an SSID common to the hotspot APs which in this embodiment is "BT-WiFi". Unlike the private network "HomeWLAN" which requires client devices to have a password credential to authenticate onto that WLAN, the public network is Open in the sense that any device can associate with the WLAN. Authentication is performed centrally at an authentication server within a hotspot network core (not shown). The WAP 5 is configured to tunnel authentication requests received from devices connected to the public WLAN to the hotspot network core via the data link 11.

The operation of the hotspot network is beyond the scope of the present disclosure and will not be described in more detail.

However in terms of the radio characteristics, the private WLAN and the public WLAN generated by the AP 5 are the same even though they are different logical networks. This attribute is used in the first embodiment as will be described below.

Extenders

As explained earlier, the range of a WLAN is dependent on the location of the AP, the frequency and transmission power of the AP and the presence and properties of obstructions which affect the propagation of the radio transmissions. For example walls made of brick and/or containing metal attenuate the signal more strongly than hollow walls or wooden furniture since they absorb radio waves. Similarly radiators and electricals also attenuate the WLAN signal.

The problem for the user is that there is no way of knowing what effect the walls and other local user premises environment will have on the range and performance of the WLAN. Furthermore, whilst the position of the WAP is often improved by being in a high and central location of the user premises, this is often not practical. In particular the location of the hub is often restricted to being close to a telephone socket for broadband and must be near a power socket. In FIG. 1 the WAP/hub 5, 9 is shown in a corner of the user premises since the telephone socket enters the user premises at this point.

In FIG. 1:
the television 7a is in an adjacent room to the hub 9 and separated by a single wall;
the desktop computer 7b is located at the far side of the house and is separated by three walls;
the tablet 8a is located in an adjacent room and separated by a single wall, however a wall radiator 13 is present at the adjoining wall;
the smartphone 8b is located in the same room as the television but in a corner such that the direct signal path traverses two walls.

The relative locations of the client devices 7, 8 with the AP 5 and the internal layout of the user premises 1 result in the signal quality (measured in terms of Signal to Noise Ratio (SNR) and Received Signal Strength Indication (RSSI)) of the WLAN being variable with location within the user premises.

Figure 2:
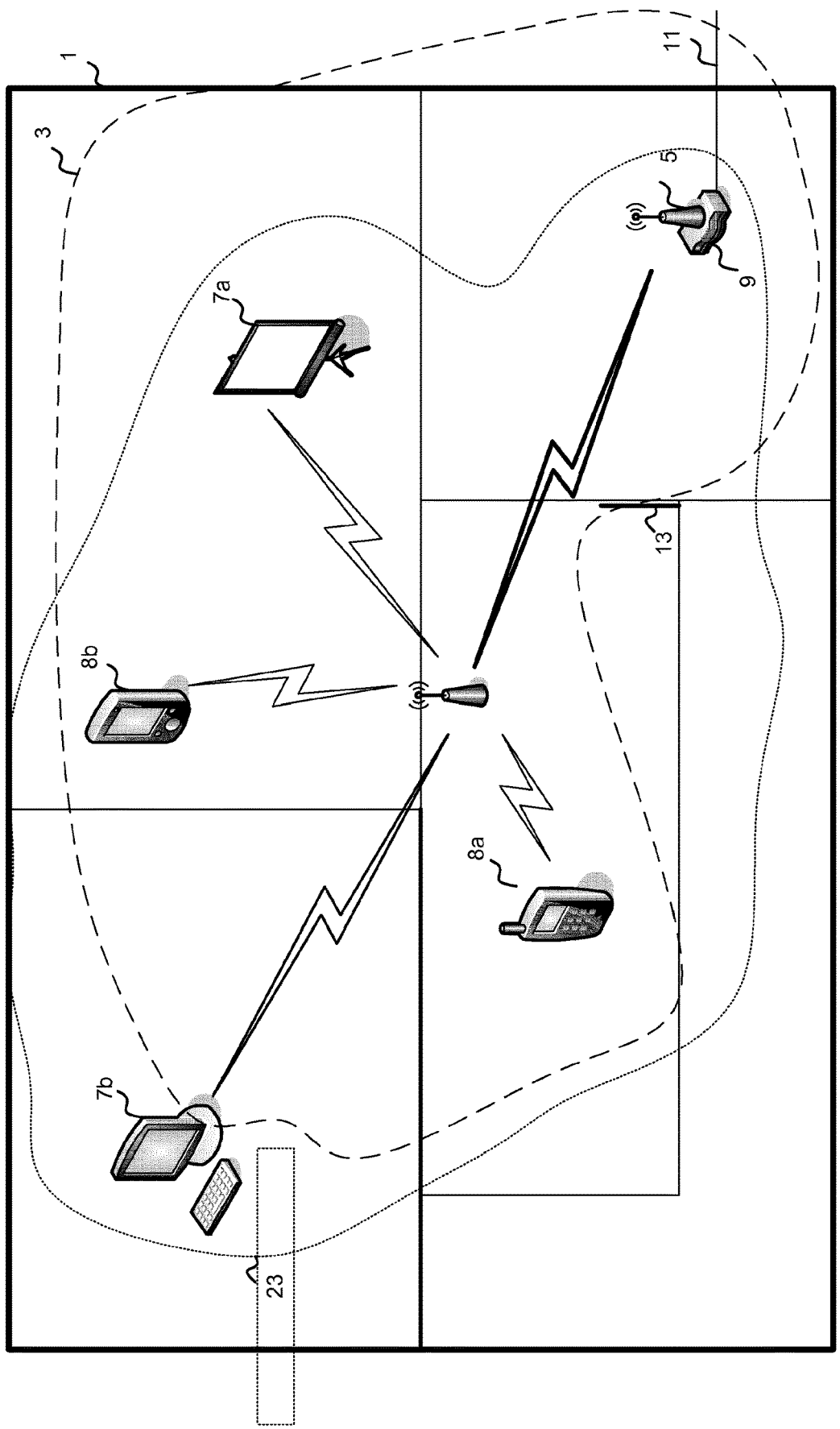
FIG. 2 shows an example user premises with an extender.

FIG. 2 shows another plan view of the user premises shown in FIG. 1 with an extender 21 present in a central location within the user premises to improve the range of the WLAN 3.

The extender 21 is configured to generate a second WLAN 23 having the same SSID and authentication settings as the private WLAN of the AP 5. Since the WLAN 3 of the AP 5 has been cloned, the client devices do not distinguish between the different physical networks. Logically it is seen as a single larger WLAN having a greater range. The default behavior of WiFi client devices 7,8 is to connect to a recognized WLAN having a greater signal strength/quality. Therefore in FIG. 2, the client devices 7,8 are shown all connected to the extender 21 instead of the AP 5 as the signal strength between each client device and the extender 21 is greater than the signal strength between each client device and the AP 5. Furthermore the extender 21 is connected as a client device of the AP 5 so that data can still be exchanged with remote resources on the Internet.

The extender 21 location is shown as an ideal location, however, it will often not be possible to place the extender in an ideal location due to the wall and power socket configuration of the user premises.

Figure 3:
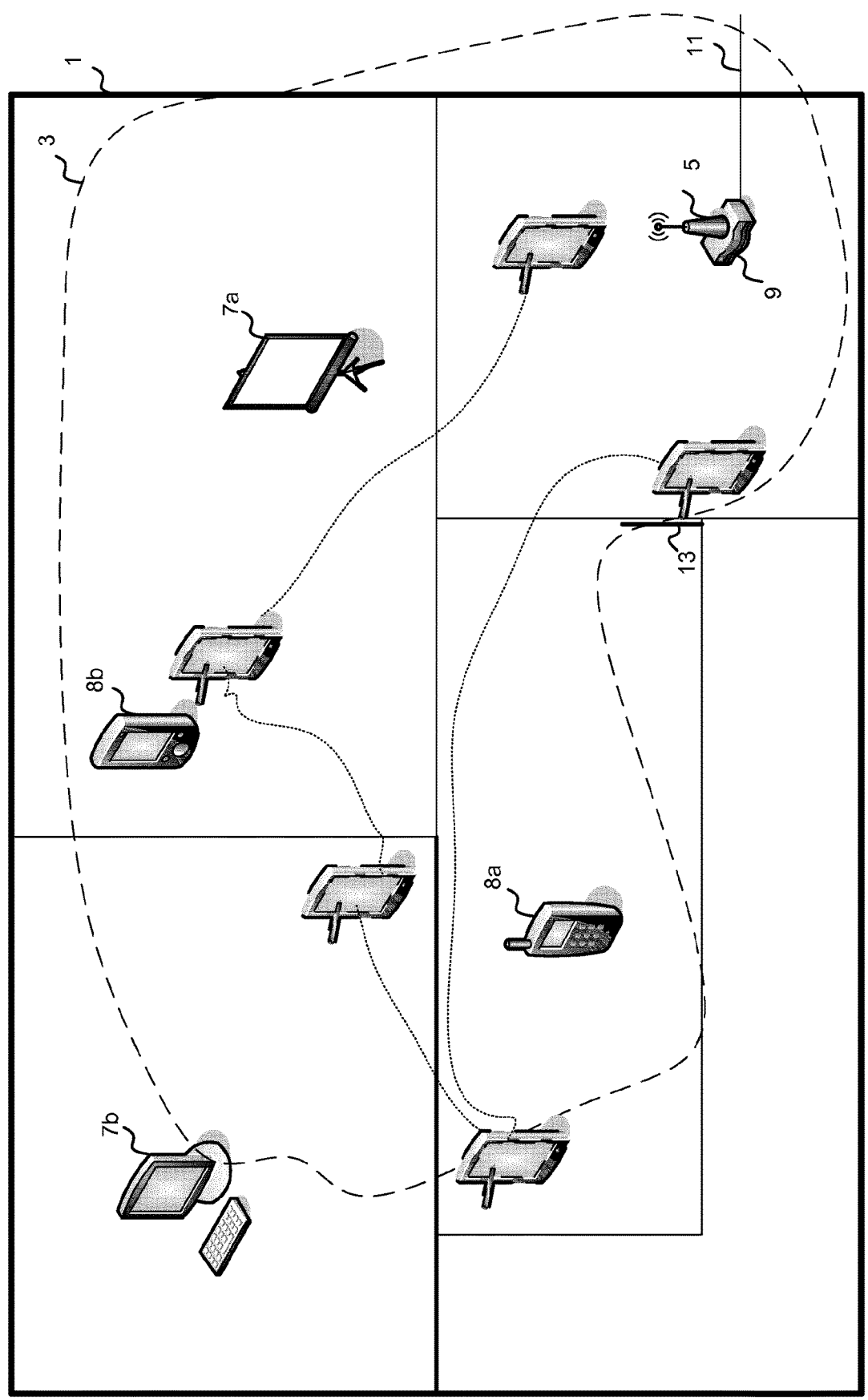
FIG. 3 shows the user premises of FIG. 2 with tester device.

As shown in FIG. 3, in the first embodiment, a client device in the user premises such as a smartphone or tablet 31 is configured as a tester device 31. The tester device 31 contains an application which can configure the tester device 31 to simulate the effects of adding an extender at various locations around the user premises in order to determine whether there is a benefit to adding an extender and if so where to place the extender.

The effect of the simulation may be to indicate that the extender should be placed much closer to the location of the mobile devices and further away from the AP.

In this embodiment, the tester device is configured to test two WLAN connections at any given location:
The link between the AP 5 and the tester device 31;
The link between the tester device 31 and client devices 7,8.

FIG. 3 shows a potential scanning path by the tester device 31 through the user premises 1.

By processing signal metrics of both links at multiple locations, the application can recommend an extender location within the user premises which optimizes the combination of both the extender to AP link and the extender to the plurality of WLAN user device links.

Wireless Device

Figure 4:
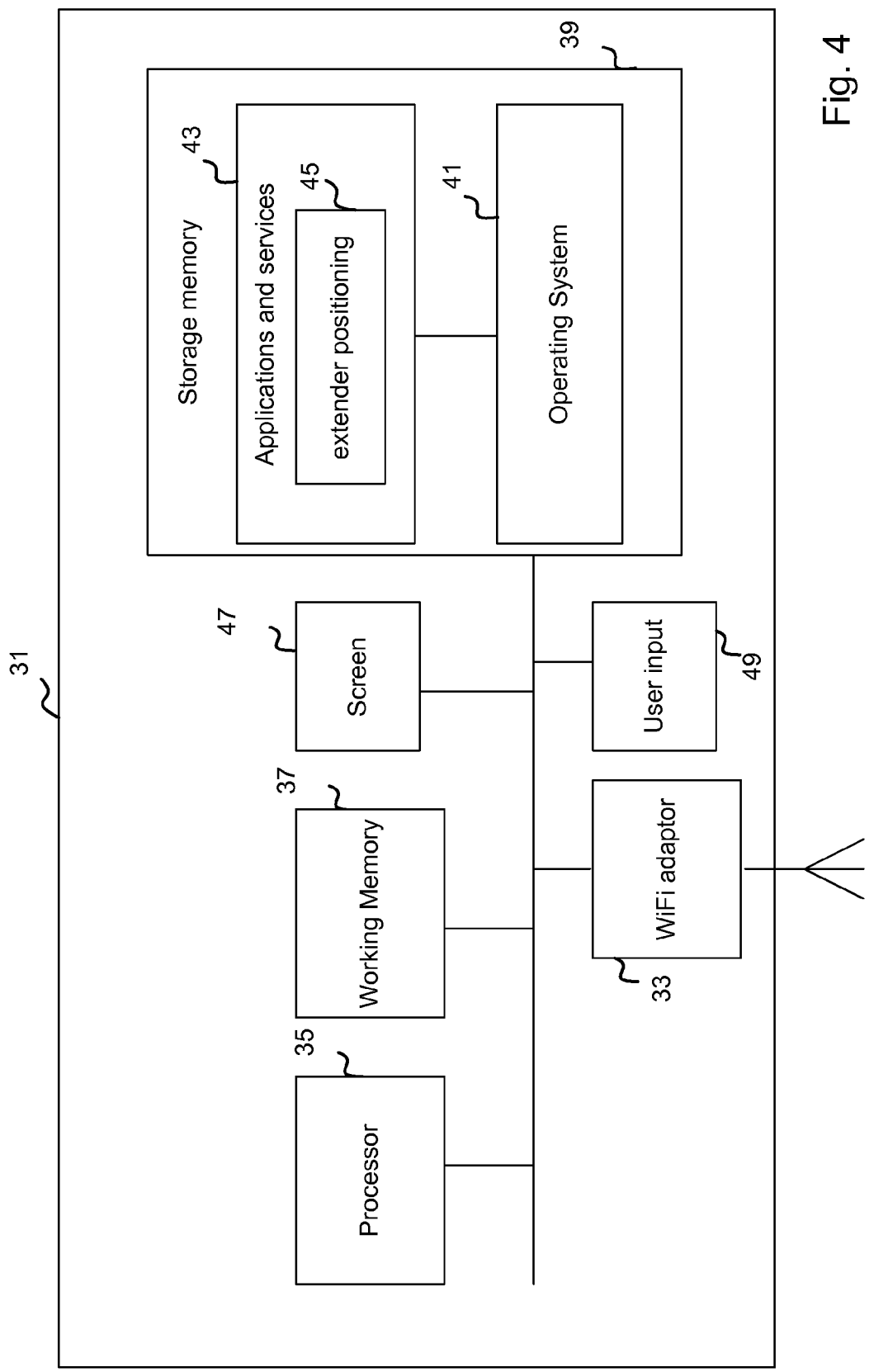
FIG. 4 shows a tester device used in the first embodiment to recommend an extender location in the user premises.

FIG. 4 shows an overview of the physical components of a tester device 31 which is configured to simulate an extender 21 and perform the sampling and recommendation processing. The tester device 31 has a WLAN adaptor 33 for communication with the AP 5 and other client device 7, 8. The wireless device also includes a data processor 35, working memory 37 and storage memory 39. The storage memory contains data which when loaded into working memory and processed by the processor 35 defines a wireless device operating system 41 and also a set of applications 43 including in the first embodiment an extender positioning application 45. The extender positioning application 45 configures the tester device 31 simulate an extender and also determine an optimal position within the user premises. The wireless device also includes a screen 47 and user input 49 such as a touchscreen and/or keyboard.

Figure 5:
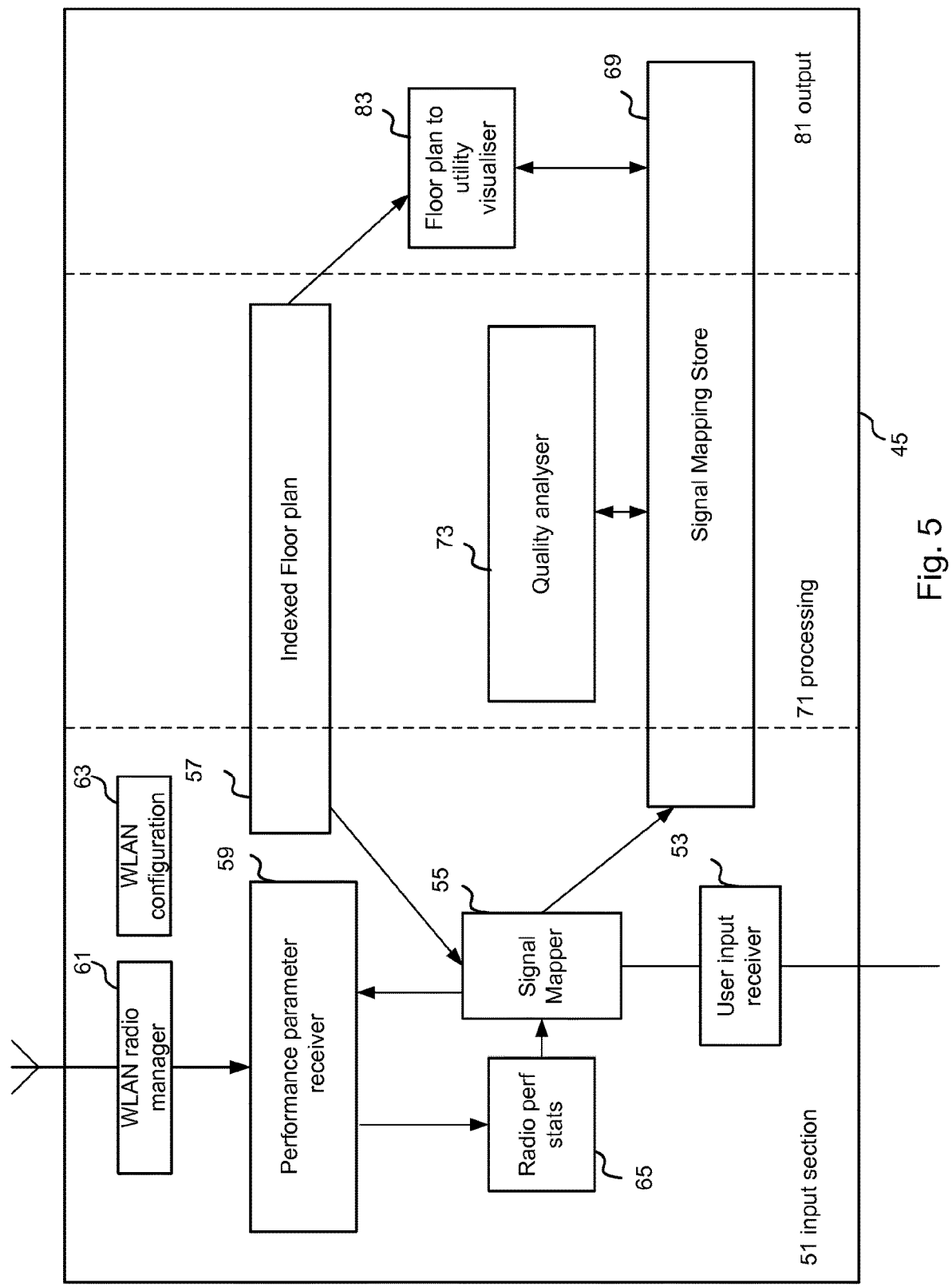
FIG. 5 shows the functional components of the tester device.

To improve understanding of the first embodiment, FIG. 5 shows the functional components of the tester device 31 when the processor 35 is executing the application 45 and therefore the tester device 31 is configured to operate in accordance with the extender positioning application 45.

The functionality can be divided into three sections, a sample data input section 51 for gathering sample data, a processing section 71 for identifying an optimal location for extender 21 and an output section 81 for displaying the results to the user.

Sample Data Input Section 51

The input section 51 is responsible for collecting sample point data at various locations around the home and associating the set of data with a location in the user premises. The input section 51 includes a user input receiver 53, a signal mapper 55, a floor plan data store 57, a performance parameter receiver 59, a WLAN adaptor manager 61 including a WLAN testing configuration processor 63, and radio performance parameter data store 65 and a signal mapping store.

When the extender positioning application 45 is running on the testing device 31, processing is initiated when the user input receiver 53 receives an input from the user via user input 49 that they wish to initiate the sampling process. The input receiver 53 forwards the message to the signal mapper 55 which is responsible for gathering sensor data to enable an extender location to be recommended to the user.

Ideally the extender positioning operation is performed at a "quiet time" when no/few other WLAN devices are sending data which would affect the reported WLAN metrics.

The user first needs to upload a floorplan of the user premises to be tested. The signal mapper 55 receives a floorplan image for the user premises 1 via the user input receiver 53 and then performs a simple grid mapping function so that points on the uploaded floor plan can be referenced with an x, y, z coordinate location code. For example the bottom left grid reference of the user premises shown in FIG. 1 is assigned the grid reference 0, 0, 0, while the top right grid reference has a reference of $X_n$, $Y_n$, 0. In this embodiment, the x and y coordinate of each grid reference relates to a 1×1 square meter area while the z coordinate indicates a floor level. This floorplan is stored in the floor plan store 57.

The grid referenced floor plan is displayed on a screen 47 of the wireless device and the user is then asked to move to the location of the hub 3 within the user premises 1 and then indicate the location of the hub on the floorplan.

Obtaining WiFi Data

After the user has uploaded a floorplan, the WLAN radio manager 61 is configured to enable measurements to be recorded.

WiFi Link to Clients

Since the tester device 31 belongs to a user of the WLAN 3, it can be assumed that the tester device 31 is already configured (or can be easily configured) with the SSID and Pre-Shared authentication key for the AP 5 and is able to connect to that AP 5 normally in the same way as any other device 7, 8.

In this embodiment, the AP 5 also stores diagnostic information related to the quality of client connections in local databases which are typically synchronized with an Internet resident server via standard protocols such as TR069 or TR101.

In order to measure the potential link quality between client device 7, 8, of the WLAN 3 and the tester device 31, the WLAN radio manager 31 using information stored in the WLAN configuration 63, instructs the AP 5 to disable the SSID of the private WLAN 3. This can be done via for example a local secure http request to the hub management webserver. When the private SSID is disabled at this point client devices 7, 8 will be disconnected form the AP 5.

The WLAN radio manager 61 is configured to use standard WiFi hotspot API features to clone the private WLAN in the same manner as an extender 21. The WLAN configuration 63 stores the SSID and the pre-shared key for the private WLAN and therefore the WLAN radio manager 61 uses that information to configure the tester device 31 as a portable hotspot using the same configuration as the AP 5 which has been temporarily disabled. The tester device 31 will start issuing beacon frames and accept connections for the same private SSID that was originally used by the AP 5.

Client devices 7, 8 which have been disconnected from the WLAN 3 of the AP 5, upon receiving beacon frames issued by the tester device 31, attempt to connect since the SSID is consistent with their previous WLAN configuration. At this point, the tester device is simulating the presence of an AP 5 that has moved to a new location within the user premises.

Link to AP

At the same time the tester device 31 is able to scan for the public network issued by the AP 5, which is still active because it is independent of the private SSID WLAN 3 which has been temporarily disabled. The tester device 31 is therefore also able to simultaneously measure the signal strength of both client devices 7, 8, connected to the generated hotspot and also the signal strength to the AP 5 via the public SSID. The tester device 31 may also have access to the Physical Link speed if available.

With the configuration of the WLAN radio manager 61, the tester device 31 is now configured to estimate the performance of an extender device 21 if it were to be placed at the current location in the user premises.

Collection of Data

At each scan location the WLAN radio manager 61 measures the RSSI (and potentially Frequency and PHY Rate) for each of the clients connected to it and the RSSI (and potentially Frequency and RSSI) for its own connection to the public WLAN of the AP 5. This data set is received by the performance parameter receiver 59 and stored in the radio performance statistics store 65.

The signal mapper 55 then associates the collected set with the grid reference associated with the user press on the floor plan 57 and stores the complete mapping in signal mapping store 69.

The process is repeated for each location that the user requires a scan which in this embodiment is the location of a mains power socket within the user premises 1.

When the user has finished scanning the user premises, they can indicate to the application 45 that all scan locations have been received.

The Application will now have a set of data consisting of a set of measurements as shown in Table 1.

TABLE 1

| Scan | Location | Public WLAN RSSI | Client RSSI STA#1 | STA#2 | STA#3 | STA#4 |
|---|---|---|---|---|---|---|
| 1 | $x_1, y_1, z_1$ | −65 | −67 | −50 | −55 | −75 |
| 2 | $x_2, y_2, z_2$ | −73 | −55 | −53 | −50 | n/a |
| 3 | $x_3, y_3, z_3$ | −71 | −57 | −57 | −45 | −67 |
| 4 | $x_4, y_4, z_4$ | −45 | n/a | −72 | −60 | −45 |

Merge with Hub Statistics about Clients

As can be seen not all client devices 7, 8 will necessarily be visible at all measurement locations. In addition it may be at some measurement locations the AP 5 is also not visible.

In addition the performance parameter receiver 59 has access to the historical WiFi diagnostics data already stored by the Access Point 5 for direct client device 7, 8 to AP 5 connections which it can download either from the AP 5 via a secure HTIP connection itself or from the centralized OA&M system prior to the sampling process.

TABLE 2

| | | Historical AP measured stats | | | | | |
|---|---|---|---|---|---|---|---|
| STA number | Client MAC | Freq | Avg RSSI | Avg. Phy | Min RSSI | Min Phy | Active session time mins/day |
| #1 | aa:bb:cc:dd:ee:aa | 2412 | −78 | 11 | −85 | 1 | 10 |
| #2 | aa:bb:cc:dd:ee:ab | 2412 | −76 | 24 | −60 | 6 | 1 |
| #3 | aa:bb:cc:dd:ee:ac | 2412 | −65 | 72 | −70 | 6 | 100 |
| #4 | aa:bb:cc:dd:ee:ad | 2412 | −50 | 72 | −70 | 130 | 100 |

Table 1 and 2 can be combined by the signal mapper 55 to produce Table 3 below

TABLE 3

| | Extender to AP RSSI | Extender to STA RSSI $RSSI_{Ext2Sta}$ | | | |
|---|---|---|---|---|---|
| Scan | $RSSI_{AP2Ext}$ AP | STA#1 ...: aa | STA#2 ...: ab | STA#3 ...: ac | STA#4 ...: ad |
| 1 | −65 | −67 | −50 | −55 | −75 |
| 2 | −73 | −55 | −53 | −50 | n/a |
| 3 | −71 | −57 | −57 | −45 | −67 |
| 4 | −45 | n/a | −72 | −60 | −45 |
| AP | — | −78 | −76 | −65 | −50 |

Processing Section 71

Once the set of data has been collected for the user premises, the processing section 71 is responsible for analyzing the data and determining a recommended location for the placement of the extender.

The quality analyzer 73 combines the tester device 31 to AP RSSI with the tester device 31 to STA RSSI to determine an equivalent table with an estimate of the end to end Station→extender→AP link quality. One example combination would be to take the min(RSSIExt2Ap, RSSIExt2STA). i.e. the link quality via the extender is determined by the worst of the two links extender to AP and extender to STA since this will determine the maximum link speed possible via the extender.

TABLE 4

| Metric | Measurement Location | AP to STA RSSI | | | |
|---|---|---|---|---|---|
| | | STA #1 ...: aa | STA #2 ...: ab | STA #3 ...: ac | STA #4 ...: ad |
| $RSSI_{End2End}$ | Extender #1 | −67 | −65 | −65 | −75 |
| $RSSI_{End2End}$ | Extender #2 | −73 | −73 | −73 | −100 |
| $RSSI_{End2End}$ | Extender #3 | −71 | −71 | −71 | −71 |
| $RSSI_{End2End}$ | Extender #4 | −100 | −72 | −60 | −45 |
| $RSSI_{AP2STA}$ | AP | −78 | −76 | −65 | −50 |

The quality analyzer 73 then determines for each client device the best possible connection quality available at each potential extender location. For some client devices this may be by connecting directly to the AP rather than connecting via a nearby extender. There are two alternatives depending on how the station chooses between the AP and an extender:

a) the AP can tell the client device whether to connect to the AP or the extender (for example using IEEE802.11v BSS transition management frames) based on the end to end link quality; or b) the client station chooses itself between the extender and the main AP based on the observed RSSI.

In option a) the end-to-end link quality computed in Table 3 is compared to the original AP to station link quality. So for each client device and each location the ExtenderlinkQuality is calculated.

If (RSSIend2end>RSSIAP2STA)
    ExtenderlinkQuality=RSSIend2end else ExtenderlinkQuality=−255.

This gives us the estimate of the best link quality available to that station from either connecting direct to the AP or via the extender for each extender location.

In option b) client devices will decide between connecting to the extender or the main AP based purely on the maximum of the RSSIExt2Sta, RSSIAPtoSta. The station link quality at each extender location is therefore given by:

If (RSSIExt2Sta>RSSIAp2Sta)
    ExtendelinkQuality=RSSIEnd2End else ExtenderlinkQuality=−255.

If the ExtenderlinkQuality is −255 this indicates that the Station would be better connecting to the AP.

TABLE 5

| Metric | Measurement Location | AP to STA RSSI | | | |
|---|---|---|---|---|---|
| | | STA #1 ...: aa | STA #2 ...: ab | STA #3 ...: ac | STA #4 ...: ad |
| LinkQuality | Extender #1 | −67 | −65 | −65 | −255 |
| LinkQuality | Extender #2 | −73 | −73 | −255 | −255 |

TABLE 5-continued

| Metric | Measurement Location | AP to STA RSSI | | | |
|---|---|---|---|---|---|
| | | STA #1 ...: aa | STA #2 ...: ab | STA #3 ...: ac | STA #4 ...: ad |
| LinkQuality | Extender #3 | −71 | −71 | −255 | −255 |
| LinkQuality | Extender #4 | −255 | −72 | −60 | −45 |

Next, number of stations with improved experience (i.e. LinkQuality>−255) for each extender location and the average link quality for the improved stations is calculated. It is possible to weight each station to reflect for example the amount of data consumed by this station using e.g. "Table 2 ActiveSessionTime per day" column.

| Metric | Measurement Location | Average STA Link Quality | Number of improved STA |
|---|---|---|---|
| LinkQuality | Extender#1 | −65 | 3 |
| LinkQuality | Extender#2 | −73 | 2 |
| LinkQuality | Extender#3 | −71 | 2 |
| LinkQuality | Extender#4 | −59 | 3 |

For rows (i.e. extender locations) where the number of improved STA is zero then these rows are removed since this means an extender at this location provides no benefit. From the remaining rows row with the highest number of improved client devices is selected and if there are multiple rows with the same number of improved stations then the selected location is the location with the highest average LinkQuality. In the example above this indicates the optimum extender location would be extender location 4.

Visualizer

The output section 81 includes a floor plan to utility visualizer 83 and accesses the signal mapping store 69.

In the output section 81, since the user may not remember their scan route, the floorplan visualizer 83 is configured to visually display the results of the processing overlaid on the user provided map of the user premises. The floor plan visualizer 83 retrieves the ranked data set and the floorplan for the user premises. As shown in FIG. 3, the visualizer 83 increases the size of the sample point marker and line thickness. In addition, the visualizer 83 can modify the screen 47 output to show different colors to represent the suitability of each location for the placement of an extender. For example green for the recommended location, orange for adequate locations and red for the worst location. The results are displayed on screen 47 of the tester device 31.

Alternatives and Modifications

In the embodiment, the hub generates a WLAN using the 2.4 GHz frequency. In an alternative, the tester app is test for an extender using the 5 Ghz band.

In a further alternative the hub is capable of forming two WLANs using different 802.11 frequencies, namely 2.4 GHz and 5 GHz. one WLAN exclusively for extender to AP link while other devices are steered to the other frequency. Since the 2.4 GHz and 5 GHz frequencies have different characteristics, the tester device is configured to obtain WLAN measurements for both so that it provides a recommended location if the WLAN link is using 2.4 GHz and a second recommended location if the WLAN link is using 5 GHz.

In the embodiment, the sample measurements are only taken at locations indicated by the user to indicate they are at a power socket. To improve the range of possible locations for the hub and remove local spikes/dips in reception affecting the recommendations, in an alternative, the application is configured to regularly take sample measurements between user selected scan sites.

After scanning is complete for the user premises, the locations for the intermediary scans are interpolated from the user's selected points. The larger set of data can then be analyzed and used to remove the effect of temporary spikes/dips in the measurement data and recommendations.

In an alternative to the operation of the utility function, a running minimum function is applied to the utility function of the embodiment e.g. the minimum over 1 m either side of the scan location to produce a new utility function. The maximum value of this utility function should indicate the centre of a relatively large area of good performance.

In the embodiment the AP has both a private LAN and a public LAN which enables the extender tester device to simultaneously measure the wireless statistics to the clients and the AP. Not all hubs are configured to be part of a public hotspot WLAN so for those hubs an alternative mechanism for determining the quality of the wireless link to the AP is required.

Some hubs can provide a guest network in addition to the main private LAN. In this case, the processing of the extender application is similar to the first embodiment whereby it can clone the private network and connect to the guest network to determine the link quality to the AP.

For hubs which do not provide a guest network or a hotspot network, the extender application is configured to clone the private network as in the embodiment and instruct the AP to temporarily disable its WLAN, but at each scan location will have to turn off the cloned network and reconnect to the AP's WLAN.

The invention claimed is:

1. A method of assessing potential physical locations for a wireless network extender in a wireless network provided by a wireless access point, the method being performed by a scan device having a wireless local area network data interface, and the scan device being configured to simulate the wireless network extender, the method comprising:
retrieving a plurality of data sets of performance data at various physical locations within a physical premises, including:
a first set of wireless network signal strength metrics between the scan device and the wireless access point, and
a second set of wireless network signal strength metrics between the scan device and at least one client device;
accessing historical RSSI data of a normal signal strength between the wireless access point and the at least one client device;
determining whether the plurality of sets of performance data indicate improvements at each of the various physical locations; and
identifying a recommended physical location for positioning the wireless network extender.

2. The method according to claim 1, further comprising:
receiving a floorplan for a user premises in which the wireless access point is situated; and
visually indicating the recommended physical location of the wireless network extender as an overlay on the floorplan.

3. The method according to claim 2, wherein the first set and the second set of wireless network signal strength metrics are retrieved in response to a user input to indicate a candidate physical location for the wireless network extender, the method further comprising:
retrieving the first set and the second set of wireless network signal strength metrics at interim physical locations between user initiated scans; and
indicating further candidate physical locations on the floorplan.

4. The method according to claim 1, further comprising:
causing the wireless access point to disable a private WLAN;
connecting to a public WLAN generated by the wireless access point and determining first signal properties; and
using credentials to the private WLAN to generate a new private WLAN having the same credentials as the private WLAN.

5. A non-transitory computer-readable storage medium storing processor executable instructions for causing a programmable processor, in a scan device having a wireless local area network data interface and being configured to simulate a wireless network extender, to assess potential physical locations for a wireless network extender in a wireless network provided by a wireless access point by:
retrieving a plurality of data sets of performance data at various physical locations within a physical premises, including:
a first set of wireless network signal strength metrics between the scan device and the wireless access point, and
a second set of wireless network signal strength metrics between a scan device and at least one client device;
accessing historical RSSI data of a normal signal strength between the wireless access point and the at least one client device;
determining whether the plurality of sets of performance data indicate improvements at each of the various physical locations; and
identifying a recommended physical location for the wireless network extender.

* * * * *